United States Patent
Härefors

(10) Patent No.: US 7,900,460 B2
(45) Date of Patent: Mar. 8, 2011

(54) OUTLET DEVICE FOR A JET ENGINE AND A JET ENGINE COMPRISING SUCH AN OUTLET DEVICE

(75) Inventor: Melker Härefors, Trollhättan (SE)

(73) Assignee: Volvo Aero Corporation, Trollhattan (SE)

( * ) Notice: Subject to any disclaimer, the term of this patent is extended or adjusted under 35 U.S.C. 154(b) by 976 days.

(21) Appl. No.: 11/718,431

(22) PCT Filed: Oct. 20, 2005

(86) PCT No.: PCT/SE2005/001574
§ 371 (c)(1), (2), (4) Date: May 2, 2007

(87) PCT Pub. No.: WO2006/049553
PCT Pub. Date: May 11, 2006

(65) Prior Publication Data
US 2008/0016873 A1  Jan. 24, 2008

(30) Foreign Application Priority Data
Nov. 5, 2004 (SE) ........................ 0402718

(51) Int. Cl.
*F02K 1/00* (2006.01)
(52) U.S. Cl. .................. 60/770; 60/230; 239/265.19
(58) Field of Classification Search .................. 60/770; 239/265.19, 265.27, 265.25, 265.35
See application file for complete search history.

(56) References Cited

U.S. PATENT DOCUMENTS

| | | | | |
|---|---|---|---|---|
| 3,087,303 A | | 4/1963 | Heinze et al. | |
| 3,581,995 A | * | 6/1971 | Fischer | 239/265.19 |
| 4,641,782 A | * | 2/1987 | Woodward | 239/265.29 |
| 4,763,840 A | * | 8/1988 | Madden | 239/265.35 |
| 4,778,109 A | * | 10/1988 | Jourdain et al. | 239/265.27 |
| 4,836,451 A | * | 6/1989 | Herrick et al. | 239/265.27 |
| 4,922,711 A | * | 5/1990 | Brown | 60/204 |
| 4,948,072 A | * | 8/1990 | Garland et al. | 244/23 D |
| 4,978,071 A | * | 12/1990 | MacLean et al. | 239/265.19 |
| 5,050,803 A | * | 9/1991 | Wakeman et al. | 239/265.35 |
| 5,092,524 A | * | 3/1992 | Garrett et al. | 239/265.19 |
| 5,110,047 A | * | 5/1992 | Toews | 239/11 |
| 5,170,964 A | * | 12/1992 | Enderle et al. | 244/52 |
| 5,261,604 A | * | 11/1993 | Meyer | 239/265.19 |

(Continued)

FOREIGN PATENT DOCUMENTS

DE  4426195 A1  1/1996

OTHER PUBLICATIONS

International Search Report from corresponding International Application PCT/SE2005/001574.

*Primary Examiner* — William H Rodríguez
(74) *Attorney, Agent, or Firm* — WRB-IP LLP

(57) ABSTRACT

An outlet device for a jet engine includes an outlet nozzle and a plurality of guide vanes arranged movably in the outlet nozzle for guiding a gas from the jet engine for the purpose of steering a craft equipped with the jet engine. At least one of the guide vanes can be adjusted into such a position that hot parts of the engine located inside the outlet nozzle are at least substantially concealed seen from the outlet side of the outlet nozzle.

18 Claims, 4 Drawing Sheets

U.S. PATENT DOCUMENTS

| | | | |
|---|---|---|---|
| 5,294,055 A * | 3/1994 | Garrett et al. | 239/265.19 |
| 5,388,765 A * | 2/1995 | Hill et al. | 239/127.3 |
| 5,613,636 A * | 3/1997 | Zubillaga et al. | 239/265.35 |
| 5,690,280 A * | 11/1997 | Holowach et al. | 239/265.25 |
| 5,699,966 A * | 12/1997 | Beverage | 239/265.19 |
| 5,717,172 A * | 2/1998 | Griffin et al. | 181/215 |
| 6,357,672 B1 * | 3/2002 | Cowan et al. | 239/265.19 |
| 6,360,527 B1 * | 3/2002 | Feder et al. | 60/232 |
| 6,360,528 B1 * | 3/2002 | Brausch et al. | 60/262 |
| 6,382,559 B1 * | 5/2002 | Sutterfield et al. | 244/23 A |
| 6,487,848 B2 * | 12/2002 | Zysman et al. | 60/262 |
| 6,681,561 B2 | 1/2004 | Weiland et al. | |
| 7,568,348 B2 * | 8/2009 | McAllister et al. | 60/771 |
| 7,578,132 B2 * | 8/2009 | Webster | 60/770 |
| 7,607,306 B2 * | 10/2009 | Steyer et al. | 60/770 |
| 7,628,356 B2 * | 12/2009 | Buffenoir et al. | 244/23 D |
| 2010/0146980 A1 * | 6/2010 | Strom et al. | 60/770 |

* cited by examiner

OUTLET DEVICE FOR A JET ENGINE AND A JET ENGINE COMPRISING SUCH AN OUTLET DEVICE

BACKGROUND AND SUMMARY

The present invention relates to an outlet device for a jet engine and also such a jet engine.

The term jet engine is intended to include various types of engine which take in air at relatively low speed, heat it via combustion and eject it at much higher speed. The term jet engine includes turbojet engines and turbofan engines, for example.

The jet engine conventionally comprises a compressor section for compression of the incoming air, a combustion chamber for combustion of the compressed air and a turbine section arranged after the combustion chamber, which turbine section is rotationally connected to the compressor section in order to drive the latter with the aid of the energy-rich gas from the combustion chamber. The compressor section usually comprises a low-pressure compressor and a high-pressure compressor. The turbine section usually comprises a low-pressure turbine and a high-pressure turbine. The high-pressure compressor is connected in a rotationally fixed manner to the high-pressure turbine via a first shaft, and the low-pressure compressor is connected in a rotationally fixed manner to the low-pressure turbine via a second shaft.

The jet engine can be used for propulsion of various types of jet-propelled craft including both landcraft and watercraft, but the invention is primarily intended to be applied in an aircraft, and then in particular in an aircraft engine. It is previously known to protect an aircraft against possible attack by providing the aircraft with a low signature. In this context, signature means contrast against the background. For example, hot structures and hot exhaust gases give rise to an IR signature.

It is also known that a tail fin on the craft gives rise to a strong radar signature. It would therefore be desirable to bring about steering of a craft in a different way.

It is desirable to produce an outlet device for a jet engine which will provide the craft propelled by the jet engine with alternative steering. Also aimed at is an outlet device for a jet engine which affords opportunities for providing the jet engine and/or the craft propelled by the jet engine with a signature reduction.

An outlet device according to an aspect of the present invention comprises an outlet nozzle and a plurality of guide vanes arranged movably in the outlet nozzle for guiding a gas from the jet engine for the purpose of steering a craft equipped with the jet engine.

By controlling the guide vanes in a suitable way, it is possible to vector the thrust from the engine and thus to increase the maneuverability of the craft, and the possibilities for flying the craft stably are thus improved.

Furthermore, at least one of the guide vanes, which is arranged in a central region of the outlet of the outlet device, can be adjusted into such a position that hot parts of the engine located inside the outlet nozzle are at least substantially concealed seen from the outlet side of the outlet nozzle. The guide vanes therefore have two functions: they are used on the one hand to steer the craft and on the other hand to conceal the view in order to reduce the IR signature. The signature reduction function is thus activated in such a way that it is used only when need arises.

BRIEF DESCRIPTION OF THE FIGURES

The invention is to be described in greater detail below with reference to the embodiment shown in the accompanying drawings, in which.

DETAILED DESCRIPTION

Figure 1:
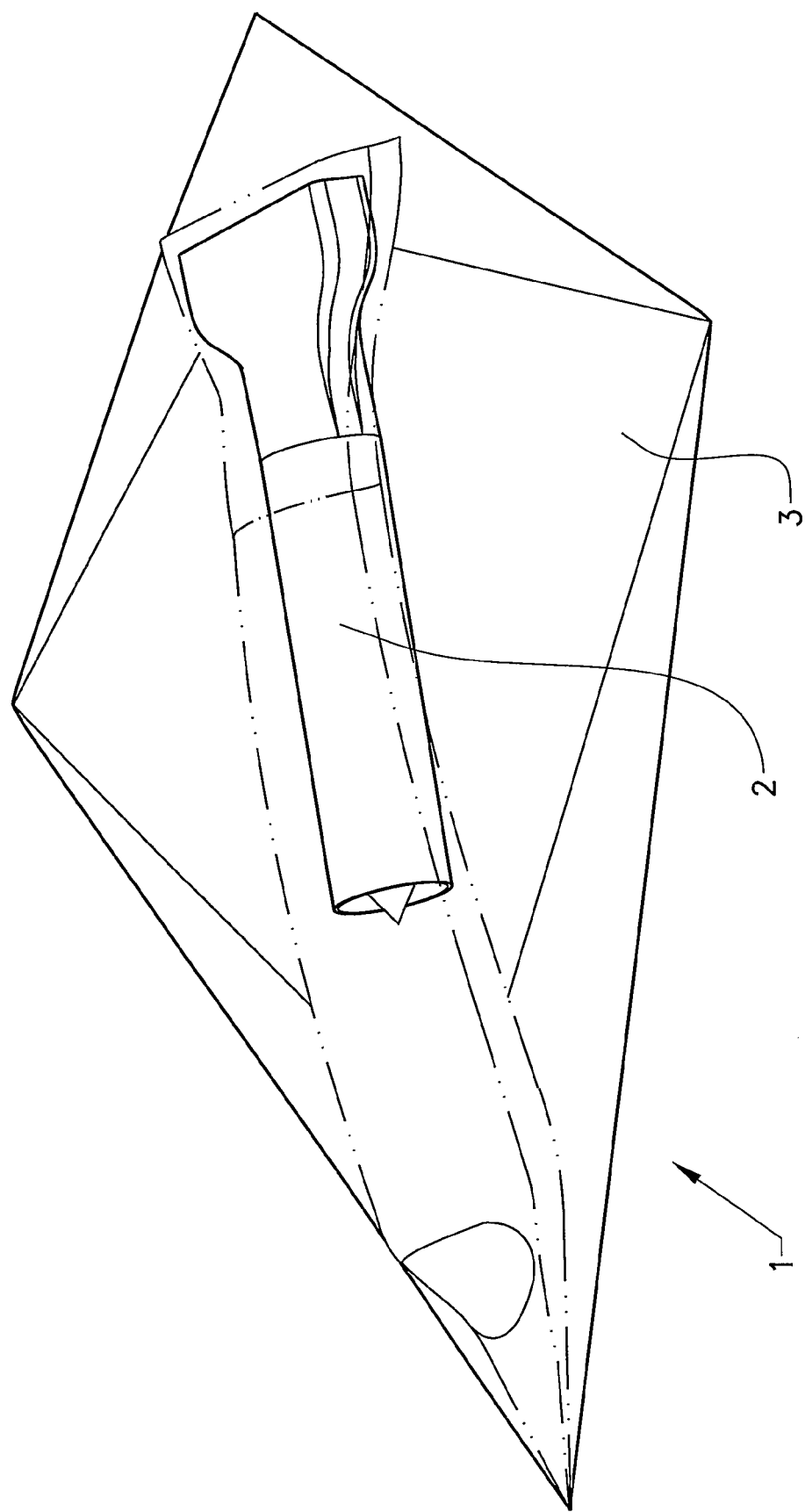
FIG. 1 shows diagrammatically a perspective view of an aircraft comprising an aircraft engine with an outlet device.

FIG. 1 shows diagrammatically a perspective view of an aircraft 1 in the form of a stealth aircraft without tail fin. A jet engine 2 (see also FIG. 2) for propulsion of the aircraft 1 is positioned centrally in the aircraft body. A wing 3 projects from the aircraft body in the lateral direction of the aircraft on both sides.

Figure 2:
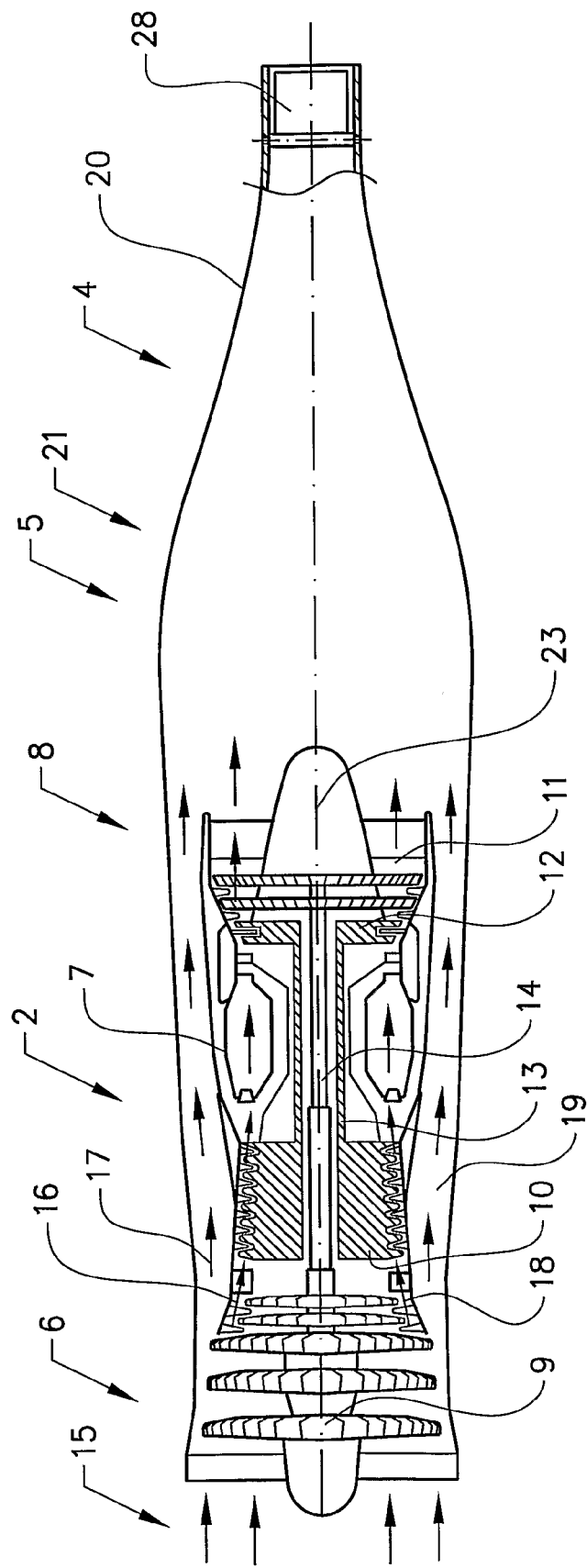
FIG. 2 shows the aircraft engine in a cross-sectional view from the side.

FIG. 2 shows a cross-sectional view of the jet engine 2. The jet engine 2 is of double-flow type and has twin rotors.

The jet engine 2 comprises a compressor section 6 for compression of the incoming air, a combustion chamber 7 for combustion of the compressed air and a turbine section 8 arranged after the combustion chamber, which turbine section is rotationally connected to the compressor section in order to drive the latter with the aid of the energy-rich gas from the combustion chamber.

The compressor section 6 comprises a low-pressure part 9, or fan, and a high-pressure part 10. The turbine section 8 comprises a low-pressure part 11 and a high-pressure part 12. The high-pressure compressor 10 is connected in a rotationally fixed manner to the high-pressure turbine 12 via a first shaft 13, and the low-pressure compressor 9 is connected in a rotationally fixed manner to the low-pressure turbine 11 via a second shaft 14. In this way, a high-pressure rotor and a low-pressure rotor are formed. These are mounted concentrically and rotate freely in relation to one another.

As stated, the jet engine 2 is of double-flow type, which means that an incoming air flow 15 is divided into two flows after it has passed through the fan 9, an inner 16, the compressor air flow, and an outer 17, the fan air flow. The jet engine 2 therefore comprises a radially inner main duct 18 for a primary flow to the combustion chamber 7 and a radially outer duct 19 for secondary flow (bypass for fan flow). The gas ducts 18, 19 are concentric and annular. The inner gas flow emerging from the jet engine 2 is called the core flow 20 below.

The fan flow 17 and the core flow 20 both have a direction substantially parallel to the axial direction 23 of the jet engine 2 out from the jet engine 2. The fan flow 17 and the core flow 20 are brought together at the outlet 5 of the jet engine 2.

An outlet device 4 is connected to the outlet 5 of the jet engine 2. The outlet 5 of the engine has a circular cross-sectional shape. The outlet device 2 comprises an outlet nozzle 20 which has an inner wall with a circular cross-sectional shape at an inner end 21 and is connected to the outlet 5 of the engine. The inner wall of the outlet nozzle 20 has an in the main rectangular cross-sectional shape at an outer end 22 (see FIGS. 3 and 4). A large width/height ratio in the rectangular shape results in rapid mixing of hot gas with the cold surrounding air and thus a low signature. The outlet nozzle also has a continuous transition from the end 21 with circular cross-sectional shape to the end 22 with rectangular cross-sectional shape.

A plurality of guide vanes 24, 25, 26, 27, 28 are arranged side by side in an outer region of the outlet nozzle 4 (see FIGS.

3 and 4). This outer region has a constant inner cross-sectional shape. The guide vanes 24, 25, 26, 27, 28 are arranged movably, and more specifically arranged continuously rotatably into a plurality of different positions, for guiding a gas from the jet engine for the purpose of steering a craft equipped with the jet engine. Each of the guide vanes 24, 25, 26, 27, 28 is arranged rotatably about a spindle 29, which spindle forms a type of hinge joint. The spindles 29 of the guide vanes 24, 25, 26, 27, 28 are arranged at a spacing in relation to one another in the lateral direction of the outlet device. The spindles 29 of the guide vanes 24, 25, 26, 27, 28 are also parallel and extend at right angles to the axial direction 23 of the engine.

The guide vanes 24, 25, 26, 27, 28 are arranged side by side along a long side of the rectangular shape of the outlet nozzle 20 with a spacing in relation to one another. The guide vanes 24, 25, 26, 27, 28 also extend substantially the whole way from a lower inner wall 30 to an upper inner wall 31. The spindles 29 therefore extend parallel to a short side 32 of the rectangular shape of the outlet nozzle 4.

Figure 5:
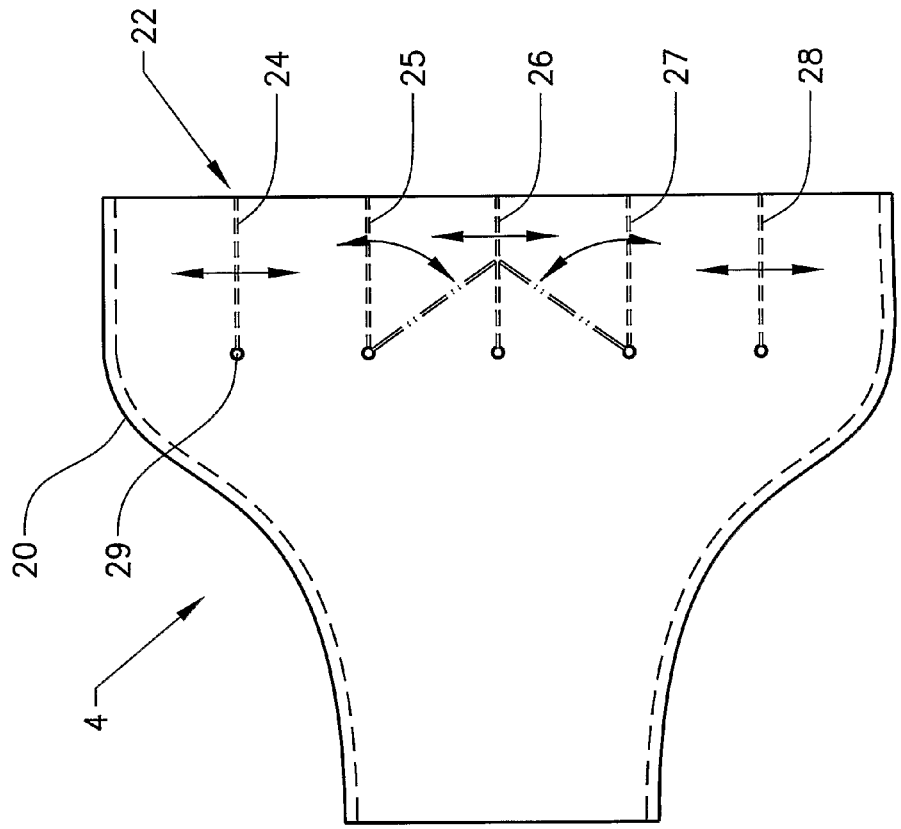
FIG. 5 shows a simplified view from above of the outlet device.

Two centrally arranged guide vanes 25, 27 can be adjusted into such a position relative to one another that hot parts of the engine, such as the turbine, located inside the outlet nozzle 5, are at least substantially concealed seen from the outlet nozzle 22 of the outlet nozzle 5. The two central guide vanes 25, 27 can be pivoted toward one another so that the spacing between their spindles is at least substantially covered seen from the outlet side 22 of the outlet nozzle 5 (see FIGS. 3 and 4). This is also illustrated by broken lines in FIG. 5. In the embodiment shown, five guide vanes are provided, and said guide vanes 25, 27 arranged rotatably toward one another comprise an inner guide vane on each side of a central guide vane 26. The right and left guide vane 25, 27 will rest against the central guide vane 26 in the position when the hot parts of the engine are intended to be concealed.

The rectangular end 22 of the outlet nozzle 5 has an extent parallel to the long side of the rectangle which is longer than the diameter of the inlet 21 of the outlet nozzle 4. The outermost guide vanes 24, 28 will lie radially outside the circular contour of the inlet 21 of the outlet nozzle 5 (see FIG. 4). The alignment of the outer guide vanes 24, 28 will therefore not appreciably affect the concealment of the hot engine parts on the inside.

The direction of the gas which flows out from the outlet nozzle 5 is therefore controlled by the alignment of the guide vanes being adjusted. In other words, the outlet jet from the jet engine is vectored.

When flying straight ahead, the guide vanes are set so that the direction of the air flow is straight backward. During aircraft maneuvers, all the guide vanes are rotated in order to provide thrust in the desired direction. It lies within the scope of the invention to guide some guide vanes in pairs or in groups in the opposite direction, or with different angles, in order to increase/decrease the outlet area and in this way change the operating point of the engine.

For adjusting the guide vanes, the device comprises one or more, say electrohydraulically controlled, actuators (not shown). Alternatively, use is made of electric motors. One actuator is used per group of guide vanes which has to be controlled individually. Alternatively, use is made of one actuator for rotating all the guide vanes and one actuator for the closing function.

The angle of the guide vanes can be detected by sensors connected to a control unit. The control unit also controls the actuators for area variation. The control unit can be integrated into the ordinary control unit of the jet engine.

The invention is not to be regarded as being limited to the illustrative embodiment described above, but a number of further variants and modifications are conceivable within the scope of the patent claims below.

It lies within the scope of the invention of course for the number of guide vanes to differ from five.

It also lies within the scope of the invention of course for the gas outlet 22 of the nozzle to have a shape which is different from rectangular, such as an oval shape or elliptical shape. However, the inner cross-sectional shape at the gas outlet 10 should have an oblong shape.

Figure 3:
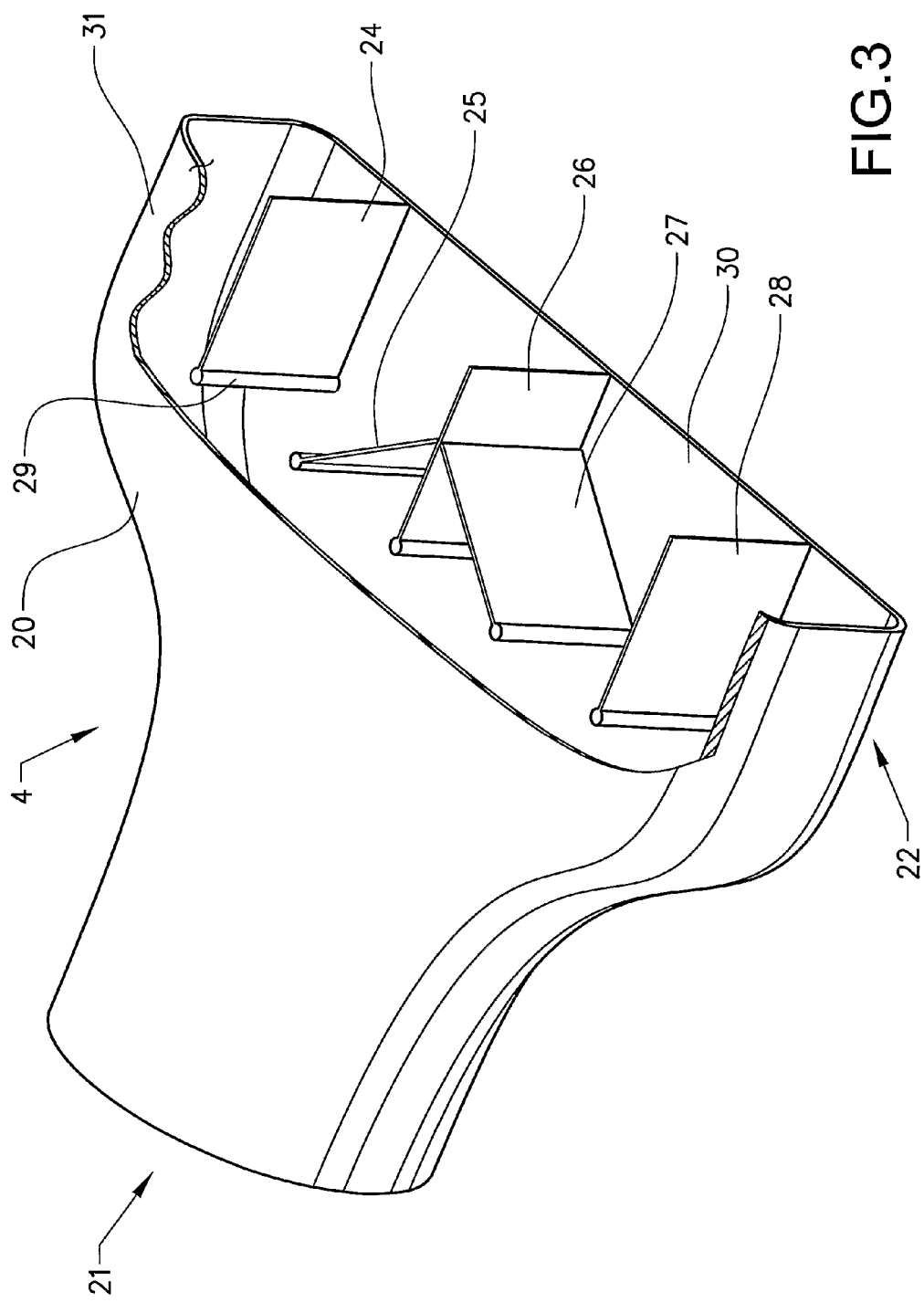
FIG. 3 shows diagrammatically a partly cut-away perspective view of the outlet device.
Figure 4:
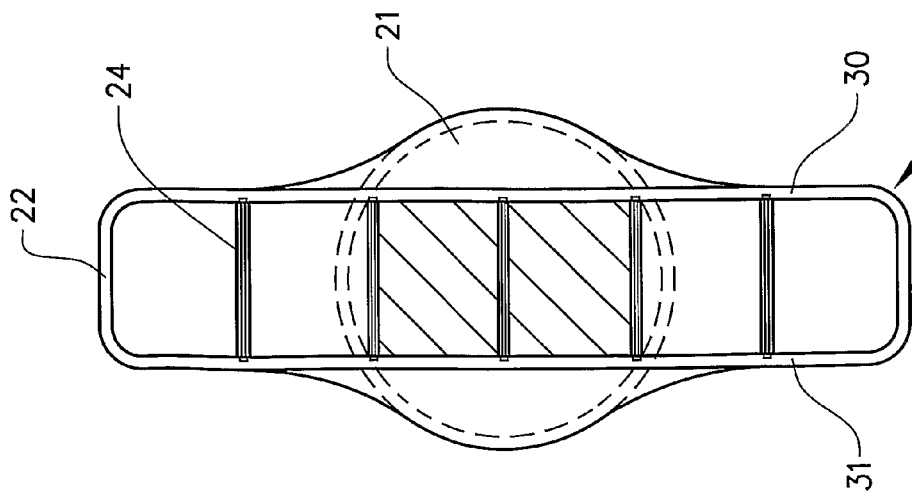
FIG. 4 shows the outlet device seen from an outlet side of the outlet nozzle.

The oblong shape defines a long transverse axis and a short transverse axis of the gas outlet. The jet engine is also intended preferably to be arranged in such a way in a craft that the long transverse axis extends in the lateral direction of the craft and the short transverse axis extends in the vertical direction of the craft. A large width/height ratio of the oblong shape is advantageous with regard to the radar signature. In FIG. 3, the gas outlet 22 has an in the main rectangular cross-sectional shape, where the long sides of the rectangular shape therefore form an upper side and a lower side of the nozzle.

The expression "in the main rectangular" used above includes the corners of the rectangle being rounded, that is to say the corners do not have a right angle.

The invention can of course be used for other types of aircraft than that shown in FIG. 1. The jet engines of the aircraft can be mounted under each wing on an aircraft, for example.

The term "jet engine" used above is intended to include various types of engine which take in air at relatively low speed, heat it via combustion and eject it at much higher speed. The term jet engine includes turbojet engines and turbofan engines, for example.

According to an alternative to the embodiment shown in FIG. 2, use is made of a jet engine of single-flow type, the flow emerging from the jet engine being formed by the core flow alone.

The invention claimed is:

1. An outlet device for a jet engine, the outlet device comprising an outlet nozzle and a plurality of guide vanes arranged movably in the outlet nozzle for guiding a gas from the jet engine for the purpose of steering a craft equipped with the jet engine, wherein at least one of the guide vanes is adapted to be adjusted into such a position that hot parts of the engine located inside the outlet nozzle are at least substantially concealed when viewed from an outlet side of the outlet nozzle, wherein the outlet nozzle defines an inner space and the guide vanes are arranged side by side with a spacing in relation to one another and extend from a lower inner wall to an upper inner wall, and the outlet nozzle defines a generally rectangular inner space at its outlet and the guide vanes are arranged side by side parallel to a short side of the rectangular shape.

2. The outlet device as claimed in claim 1, wherein each of the guide vanes is arranged rotatably about a spindle into a plurality of different positions.

3. The outlet device as claimed in claim 2, wherein the spindles of the guide vanes are parallel.

4. The outlet device as claimed in claim 3, wherein the outlet nozzle defines an inner space and the guide vanes are arranged side by side with a spacing in relation to one another and extend from a lower inner wall to an upper inner wall.

5. The outlet device as claimed in claim 3, wherein the outlet nozzle widens from an inlet toward a portion where the guide vanes are arranged.

6. The outlet device as claimed in claim 3, wherein the inlet of the outlet nozzle has a generally circular cross-sectional shape.

7. The outlet device as claimed in claim 2, wherein the outlet nozzle defines an inner space and the guide vanes are arranged side by side with a spacing in relation to one another and extend from a lower inner wall to an upper inner wall.

8. The outlet device as claimed in claim 7, wherein the outlet nozzle defines generally rectangular inner space at its outlet and the guide vanes are arranged side by side parallel to a short side of the rectangular shape.

9. The outlet device as claimed in claim 8, wherein the outlet nozzle defines generally rectangular inner space at its outlet and the guide vanes are arranged side by side parallel to a short side of the rectangular shape.

10. The outlet device as claimed in claim 2, wherein the outlet nozzle widens from an inlet toward a portion where the guide vanes are arranged.

11. The outlet device as claimed in claim 2, wherein the inlet of the outlet nozzle has a generally circular cross-sectional shape.

12. The outlet device as claimed in claim 1, wherein the outlet nozzle widens from an inlet toward a portion where the guide vanes are arranged.

13. The outlet device as claimed in claim 1, wherein the inlet of the outlet nozzle has a generally circular cross-sectional shape.

14. A jet engine, comprising an outlet device as claimed in claim 1.

15. A jet-propelled craft, comprising an outlet device as claimed in claim 1.

16. The outlet device as claimed in claim 1, wherein the outlet nozzle widens from an inlet toward a portion where the guide vanes are arranged.

17. The outlet device as claimed in claim 1, wherein the inlet of the outlet nozzle has a generally circular cross-sectional shape.

18. The outlet device as claimed in claim 1, wherein the outlet nozzle widens from an inlet toward a portion where the guide vanes are arranged.

* * * * *